No. 797,518. PATENTED AUG. 15, 1905.
S. KROHN.
SYSTEM OF ELECTRICAL DISTRIBUTION.
APPLICATION FILED NOV. 2, 1899.
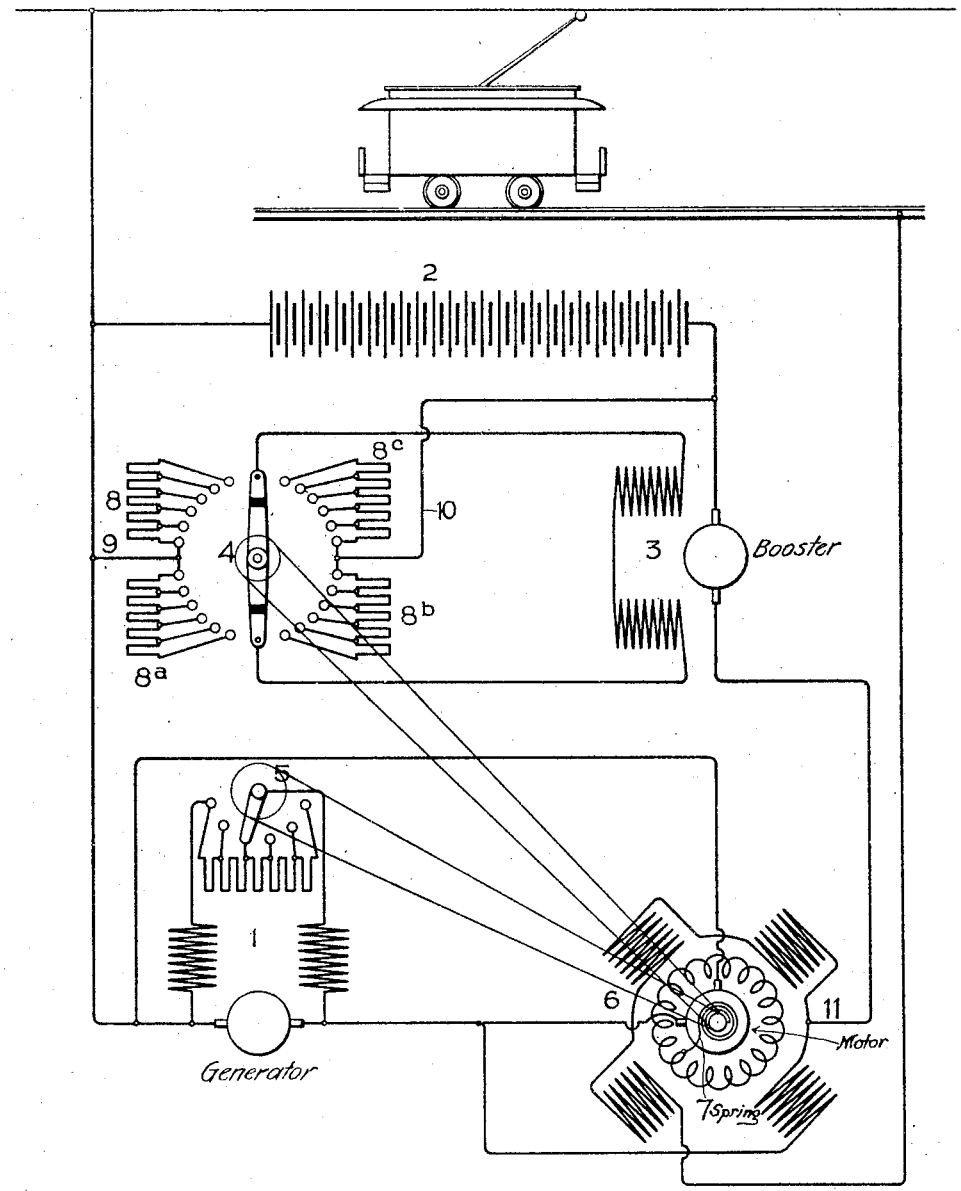
Witnesses.
Lewis Abell
Benjamin B. Hull.
Inventor.
Sigvald Krohn.
by Albert G. Davis
Atty

UNITED STATES PATENT OFFICE.

SIGVALD KROHN, OF BERLIN, GERMANY.

SYSTEM OF ELECTRICAL DISTRIBUTION.

No. 797,518.   Specification of Letters Patent.   Patented Aug. 15, 1905.

Application filed November 2, 1899. Serial No. 735,562.

*To all whom it may concern:*

Be it known that I, SIGVALD KROHN, a subject of the King of Sweden and Norway, residing at Berlin, Germany, have invented certain new and useful Improvements in Systems of Electrical Distribution, of which the following is a specification.

The object of this invention is to render the voltage in a system of electrical distribution constant in spite of variations of load and to render the fluctuation of voltage at the bus-bars variable directly as the current supplied to the feeders. This end is ordinarily effected by overcompounded generators, with the disadvantage, however, that where the load fluctuates widely the economical efficiency of the installation is not as high as desirable. I promote a greater economy by employing a storage battery to absorb part of the load when the demand becomes greater than the capacity of the generator. Compound-wound generators cannot be worked in parallel with a storage battery except when connected up in such a way that the main feature of the compounding is lost. I organize the system so that shunt-wound generators may be employed, my system being so arranged that the battery and shunt-wound generator mutually coöperate to maintain a uniform potential in the work-circuit, having feeders no heavier than those in circuits supplied by overcompounded generators.

In carrying out my invention I provide an auxiliary generator in series with the battery and regulate the potential of both this and the main generator by a device responsive to work-current to equalize the load on the main generator and have the battery absorb or supply any variation from the normal load. In this way a generator of comparatively small capacity may be employed and may be operated at a minimum expense, since the engines or prime movers which drive it operate continuously at their most economical load.

The features of novelty of my invention will be more fully hereinafter described and will be definitely indicated in the claims.

In the accompanying drawing, which diagrammatically illustrates a system embodying my improvements, 1 represents a shunt-wound generator in parallel relation with the storage battery 2 to a distribution-circuit. In series with the storage battery is an equalizing generator or booster 3, the field-magnet circuit of which is connected across the bus-bars or in parallel with the battery and includes a rheostat 4. The field-magnet circuit of the generator 1 includes a variable resistance 5. Both of the rheostats 4 and 5 are automatically controlled by an electromagnetic controlling device, such as the motor 6. This may be variously organized to accomplish the function for which it is designed—namely, to shift the switches of the rheostats 4 and 5 or to vary the strength of the field-magnets of machines 1 and 3. The type of device shown is a simple torque device provided with two windings similar to a motor, one fixed and the other movable, and a spring retractile device 7 to give the movable member a normal bias toward a zero position. One of the operative circuits of this torque device (that depicted in the drawing as the movable circuit) is in shunt relation to the generator 1 or other source of practically constant electromotive force. This may be arranged as an ordinary ring or drum armature, and the other member may be arranged as a field-magnet of any desired number of poles, the winding of the latter being in series relation to the work-circuit, so that its excitation may vary with the load on said circuit. The adjusting-levers of both rheostats 4 and 5 are controlled by the movable member of this torque device and may be mounted directly on its shaft. It will therefore be evident that the armature of the torque device is shifted against the tension of the spring 7 over a variable angle, depending upon the load on the work-circuit or the strength of the work-current.

The current-varying device for the field-magnet of the generator 1 may be a simple resistance cut in or out by the movement of the torque device. The booster-rheostat 4 is arranged to both vary the resistance and reverse the direction of current in the booster field-magnet. To this end it may carry two brushes or contacts insulated from one another connecting, respectively, with the terminals of the field-magnet coil of the booster, as shown in the drawing. A circular series of contacts coöperate with these brushes and may be arranged in four quadrants $8\ 8^a\ 8^b\ 8^c$, the quadrants 8 and $8^a$ having their contacts connected to corresponding resistances connecting at the middle point with the conductor 9, leading to one of the bus-bars. The quadrants $8^b$ and $8^c$ are similarly arranged with the middle point connecting through a conductor 10 to a point between the storage battery and the booster. The booster may be driven by an electric motor or by a prime mover.

As thus organized the system operates as follows: Assuming that the load on the station is zero, the torque on the controlling device 6 is also zero, and its operating-spring retracts it to its zero position, thus putting the switch-arms of the rheostats 4 and 5 in a position where a maximum resistance is included in the field-magnet of the generator 1, and a minimum resistance is inserted in the field-magnet of the booster 3. The voltage of the generator 1 is therefore a minimum and that of the booster a maximum in opposition to the electromotive force of the storage battery. Thus there is a minimum voltage on the bus-bars, and the generators 1 and 3 are both charging in series the storage battery. At full load on the generator 1 the torque of the controlling device 6 increases with the greater strength of work-current and the movable member advances against the tension of the spring to a middle position, simultaneously shifting the adjusting-levers of rheostats 4 and 5. Thus part of the resistance will be cut out of the field-magnet circuit of the generator 1, increasing its voltage in the bus-bars. The field-magnet of the booster will be on open circuit, as indicated in the drawing, and the booster will be delivering no voltage at all. Thus the battery will be neither charging nor discharging, since the battery-potential balances the potential of the generator at full load, and the main generator 1 will be supplying all the current to the work-circuit. In a condition of maximum load the increased strength of work-current shifts the controlling device 6 to its maximum position against the tension of its retractile spring, cutting out all resistance from the field-magnet circuit of the generator 1, establishing the maximum voltage due to the latter on the bus-bars, and reversing the direction of current in the field-magnet of the booster 3, thus putting its electromotive force in the same direction as that of the battery and permitting both the battery and booster to discharge in series. In this condition of adjustment the battery is discharging at its maximum rate and is delivering to the work-circuit the excess of load above the capacity of the generator 1.

In order to render the controlling-motor which establishes the regulation responsive to the load imposed by the storage battery, as well as that in the work-circuit, the field-magnet circuit of said motor is partly energized by the storage-battery branch, which may be tapped at a point 11 between the terminals of the field-magnet circuit of the motor.

What I claim as new, and desire to secure by Letters Patent of the United States, is—

1. A system of electrical distribution comprising a generator, a distribution-circuit, a storage battery in parallel with the generator, a booster in the battery branch, an electromagnetic regulating device in the distribution-circuit, and a current varying and reversing switch for the booster field-magnet controlled by said regulating device.

2. A system of electrical distribution, comprising a generator, a distribution-circuit, a storage battery in parallel with the generator, a booster in the battery branch, and a current-regulator responsive to changes of load on the system and means controlled thereby for adjusting the strength of both the generator and booster fields, to maintain the potential on the system constant.

3. A system of electrical distribution comprising a generator, a distribution-circuit, a storage battery in parallel with the generator, a booster in the battery branch, and a regulating-rheostat for the booster field-magnet controlled by the conjoint action of the distribution and storage battery currents.

4. A system of electrical distribution comprising a constant-potential generator, a distribution-circuit, a storage battery in parallel with the generator, a booster in the battery branch, a rheostat in the booster-field, and a torque device for adjusting said rheostat, having one element of constant magnetization and the other magnetized by the conjoint influence of the work-current and the current of the storage-battery branch.

5. A system of electrical distribution, comprising a generator, a storage battery in parallel relation thereto, an equalizing-generator in series with the battery, controlling devices responsive to work-current and means for varying the potential of the equalizing-generator and reversing its direction for the purpose described.

6. A system of electrical distribution comprising a generator, a storage battery in parallel relation thereto, an equalizing-generator in the battery branch, automatic regulating devices for both generators, and common means responsive to the work-current for controlling the same, whereby a uniform potential is maintained in the work-circuit.

In witness whereof I have hereunto set my hand this 16th day of October, 1899.

SIGVALD KROHN.

Witnesses:
 WOLDEMAR HAUPT,
 HENRY HASPER.